(12) United States Patent
Talwar et al.

(10) Patent No.: US 12,087,072 B2
(45) Date of Patent: *Sep. 10, 2024

(54) METHOD AND SYSTEM FOR TABULAR INFORMATION EXTRACTION

(71) Applicant: JPMorgan Chase Bank, N.A., New York, NY (US)

(72) Inventors: Sidharth Talwar, Bangalore (IN); Sanjay Saran Garg, Bangalore (IN); Ranjit Radhakrishnan, Mumbai (IN); Sunil Nair, Mumbai (IN); Devang Jayachandran, Kerala (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,369

(22) Filed: Apr. 17, 2023

(65) Prior Publication Data

US 2023/0260311 A1    Aug. 17, 2023

Related U.S. Application Data

(63) Continuation of application No. 17/090,143, filed on Nov. 5, 2020, now Pat. No. 11,663,842.

(51) Int. Cl.
  *G06V 30/414* (2022.01)
  *G06V 30/148* (2022.01)
  *G06V 30/412* (2022.01)

(52) U.S. Cl.
  CPC ......... *G06V 30/414* (2022.01); *G06V 30/153* (2022.01); *G06V 30/412* (2022.01)

(58) Field of Classification Search
  CPC ... G06V 30/414; G06V 30/153; G06V 30/412
  See application file for complete search history.

(56) References Cited

U.S. PATENT DOCUMENTS

| | | | |
|---|---|---|---|
| 11,556,572 B2 * | 1/2023 | Morris | G06F 17/16 |
| 2011/0002547 A1 * | 1/2011 | Enomoto | G06V 30/412 382/195 |
| 2012/0134590 A1 * | 5/2012 | Petrou | G06V 30/418 382/182 |
| 2014/0155022 A1 * | 6/2014 | Kandregula | H04W 4/50 455/405 |
| 2017/0220858 A1 * | 8/2017 | Stitz | G06V 30/412 |
| 2019/0266394 A1 * | 8/2019 | Yu | G06V 30/413 |

(Continued)

*Primary Examiner* — Ming Y Hon
(74) *Attorney, Agent, or Firm* — Greenblum & Bernstein, P.L.C.

(57) ABSTRACT

A method and a system for extracting information from a table in a document is provided. The method includes: receiving a document that includes information that is arranged in a table; determining three sets of coordinates that respectively relate to lines, words, and characters included in the document; extracting a list of lines based on the first set of coordinates; reconstructing the rows of the table based on list of lines and the second set of coordinates; reconstructing the columns of the table based on the reconstructed rows and the third set of coordinates; and outputting a reconstruction of the table. The three sets of coordinates are expressible in an hOCR format that is based on an open standard for representation of scanned information that is obtainable by using an optical character recognition (OCR) technique.

20 Claims, 7 Drawing Sheets

(56) References Cited

U.S. PATENT DOCUMENTS

| | | | |
|---|---|---|---|
| 2020/0042837 A1* | 2/2020 | Skinner | H04L 63/102 |
| 2020/0175304 A1* | 6/2020 | Vig | G06F 16/2455 |
| 2021/0201018 A1* | 7/2021 | Patel | G06F 18/22 |
| 2021/0240976 A1* | 8/2021 | Tiyyagura | G06V 30/414 |
| 2021/0248367 A1* | 8/2021 | Gal | G06V 10/454 |
| 2021/0406533 A1* | 12/2021 | Arroyo | G06N 3/045 |
| 2022/0398598 A1* | 12/2022 | Das | G06F 40/35 |

\* cited by examiner

```
<?xml version="1.0" encoding="UTF-16"?>
<Document id="20200207.080053.02" xmlns:xsd="http://www.w3.org/2001/
  <Page lang="en-us" id="20200207.080053.02_0_1" ydpi="300" xdpi="300"
    <Block pos="312,270,982,348">
      <L pos="312,270,982,348">
        <W pos="312,270,573,347" cm="9955999" s="0" v="College">
          <C pos="312,278,370,333" cm="10" s="0" v="C"/>
          <C pos="376,287,407,333" cm="10" s="0" v="o"/>
          <C pos="415,271,435,333" cm="6" s="0" v="l"/>
          <C pos="441,271,460,333" cm="6" s="0" v="l"/>
          <C pos="466,287,495,333" cm="10" s="0" v="e"/>
          <C pos="502,287,541,347" cm="10" s="0" v="g"/>
          <C pos="546,287,573,333" cm="10" s="0" v="e"/>
        </W>
      </S/>
      <W pos="676,272,752,333" cm="99" s="0" v="ak">
        <C pos="676,288,711,333" cm="10" s="0" v="a"/>
        <C pos="717,272,752,333" cm="10" s="0" v="k"/>
      </W>
      <S/>
      <W pos="855,272,982,348" cm="4444" s="0" v="Yana">
        <C pos="855,272,826,336" cm="5" s="0" v="Y"/>
        <C pos="878,288,912,336" cm="5" s="0" v="a"/>
        <C pos="917,288,942,348" cm="5" s="0" v="n"/>
        <C pos="947,288,982,336" cm="5" s="0" v="a"/>
      </W>
    </L>
  </Block>
  <Block pos="357,383,842,417">
```

FIG. 6

| Expense | | | | | |
|---|---|---|---|---|---|
| OPERATING EXPENSES | | | | | |
| Utilities | | | | | |
| | Trash Service | 582.44 | 582.44 | 582.44 | 582.44 |
| | Phone | 106.45 | 106.45 | 106.63 | 106.42 |
| | Internet | 70.00 | 70.00 | 70.00 | 70.00 |
| | Electric | 423.96 | 471.11 | 440.14 | 398.34 |
| | Gas | 1,165.92 | 1,208.92 | 1,302.12 | 1,136.34 |
| | Vacant Apts Utilities | 54.28 | 52.63 | 0.00 | 0.00 |
| | Water and Sewer | 2,943.13 | 3,539.85 | 2,727.53 | 5,702.42 |
| | Total Utilities | 5,346.18 | 6,031.40 | 5,228.86 | 7,993.96 |
| Monthly Contracts | | | | | |
| | Pool Service | 755.55 | 436.20 | 240.00 | 240.00 |

Rows Containing Mode Number of Column ⟶

METHOD AND SYSTEM FOR TABULAR INFORMATION EXTRACTION

CROSS-REFERENCE TO RELATED APPLICATION(S)

This application is a Continuation of U.S. patent application Ser. No. 17/090,143, filed on Nov. 5, 2020. The disclosure of each of these documents, including the specification, drawings, and claims, is incorporated herein by reference in its entirety.

BACKGROUND

1. Field of the Disclosure

This technology generally relates to methods and systems for extracting information from tables, and more particularly, to methods and systems for extracting and converting tabular information from image and digital formats to editable file formats in order to facilitate subsequent automated processing, data analysis, information extraction, data modeling, building cognitive solutions, building natural language processing solutions, and/or document understanding.

2. Background Information

Many documents, such as, for example, a vast majority of financial documents, include tabular data and require conversion from a digital format or a scanned format to a format that may be easily consumed for automation.

Portable Digital Format (PDF) has revolutionized the digitization era by enabling commercial entities to conveniently store multiple data format types in a single file format. However, there is a need to extract and store structured data from a mix of structure and unstructured data, in order to make the data available for further processing for automation services, data analysis, information extraction, data modeling, building cognitive solutions, building natural language processing solutions, and/or document understanding.

SUMMARY

The present disclosure, through one or more of its various aspects, embodiments, and/or specific features or sub-components, provides, inter alia, various systems, servers, devices, methods, media, programs, and platforms for extracting and converting tabular information from image and digital formats to editable file formats in order to facilitate subsequent automated processing, data analysis, information extraction, data modeling, building cognitive solutions, building natural language processing solutions, and/or document understanding.

According to an aspect of the present disclosure, a method for extracting and converting tabular information from image and digital formats to editable file formats is provided. The method is implemented by at least one processor. The method includes: receiving, by the at least one processor, a document that includes information that is arranged in a table; determining, by the at least one processor, a first set of line coordinates that relates to a plurality of lines of the document; determining, by the at least one processor, a second set of word coordinates that relates to a plurality of words included in the document; determining, by the at least one processor, a third set of character coordinates that relates to a plurality of characters included in the document; extracting, by the at least one processor, a list of lines from among the plurality of lines based on the first set of coordinates; reconstructing, by the at least one processor, a plurality of rows of the table based on the extracted list of lines and the determined second set of coordinates; reconstructing, by the at least one processor, a plurality of columns of the table based on the reconstructed plurality of rows and the determined third set of coordinates; and outputting, by the at least one processor, a reconstruction of the table based on the reconstructed plurality of rows and the reconstructed plurality of columns.

Each of the first set of coordinates, the second set of coordinates, and the third set of coordinates may be expressible in an hOCR format that is based on an open standard for representation of scanned information that is obtainable by using an optical character recognition (OCR) technique.

The method may further include: determining, by the at least one processor, information that relates to text that is present in the document; determining, by the at least one processor, information that relates to a bounding box with respect to each of the first set of coordinates, the second set of coordinates, and the third set of coordinates; and determining, by the at least one processor, at least one confidence score that relates to a quality of character recognition with respect to the plurality of characters included in the document.

The extracting of the list of lines may include extracting metadata that relates to a respective position with respect to the bounding box for each line from among the list of lines.

The reconstructing of the plurality of rows of the table may include: calculating a minimum space between any two consecutive lines in the document; calculating, for each respective word included in the plurality of words, a respective line coordinate that corresponds to a midpoint of the respective word; and using the calculated minimum space between lines and the calculated respective line coordinate for each respective word to reconstruct the plurality of rows.

The reconstructing of the plurality of columns of the table may include: determining a maximum width of characters included in the plurality of characters; determining, for each respective row within the reconstructed plurality of rows and based on the determined maximum width of characters, whether each respective pair of consecutive words belong in a same column; and using the determined maximum character width and the calculated determination for each respective pair of consecutive words to reconstruct the plurality of columns.

The document may have a first file format. The outputted reconstruction of the table may have a second file format that is different from the first file format.

The first file format may include at least one from among a Portable Digital Format (PDF) format, an image file format, and a word processing software format.

The second file format may include at least one from among a Hypertext Markup Language (HTML) format, an Extensible Markup Language (XML) format, an Extensible Hypertext Markup Language (XHTML) format, a JavaScript Object Notation (JSON) format, a Dataframe format, a File Object format, a Byte Stream format, and a spreadsheet software format that facilitates performance of arithmetic operations with respect to at least a portion of the information included in the table.

According to another exemplary embodiment, a computing apparatus for extracting information from a table in a document is provided. The computing apparatus includes a processor, a memory, and a communication interface coupled to each of the processor and the memory. The processor is configured to: receive, via the communication interface, a document that includes information that is arranged in a table; determine a first set of line coordinates that relates to a plurality of lines of the document; determine a second set of word coordinates that relates to a plurality of words included in the document; determine a third set of character coordinates that relates to a plurality of characters included in the document; extract a list of lines from among the plurality of lines based on the first set of coordinates; reconstruct a plurality of rows of the table based on the extracted list of lines and the determined second set of coordinates; reconstruct a plurality of columns of the table based on the reconstructed plurality of rows and the determined third set of coordinates; and output, via the communication interface, a reconstruction of the table based on the reconstructed plurality of rows and the reconstructed plurality of columns.

Each of the first set of coordinates, the second set of coordinates, and the third set of coordinates may be expressible in an hOCR format that is based on an open standard for representation of scanned information that is obtainable by using an optical character recognition (OCR) technique.

The processor may be further configured to: determine information that relates to text that is present in the document; determine information that relates to a bounding box with respect to each of the first set of coordinates, the second set of coordinates, and the third set of coordinates; and determine at least one confidence score that relates to a quality of character recognition with respect to the plurality of characters included in the document.

The processor may be further configured to extract metadata that relates to a respective position with respect to the bounding box for each line from among the list of lines.

The processor may be further configured to: calculate a minimum space between any two consecutive lines in the document; calculate, for each respective word included in the plurality of words, a respective line coordinate that corresponds to a midpoint of the respective word; and use the calculated minimum space between lines and the calculated respective line coordinate for each respective word to reconstruct the plurality of rows.

The processor may be further configured to: determine a maximum width of characters included in the plurality of characters; determine, for each respective row within the reconstructed plurality of rows and based on the determined maximum width of characters, whether each respective pair of consecutive words belong in a same column; and use the determined maximum character width and the calculated determination for each respective pair of consecutive words to reconstruct the plurality of columns.

The document may have a first file format. The outputted reconstruction of the table may have a second file format that is different from the first file format.

The first file format may include at least one from among a Portable Digital Format (PDF) format, an image file format, and a word processing software format.

The second file format may include at least one from among a Hypertext Markup Language (HTML) format, an Extensible Markup Language (XML) format, an Extensible Hypertext Markup Language (XHTML) format, a JavaScript Object Notation (JSON) format, a Dataframe format, a File Object format, a Byte Stream format, and a spreadsheet software format that facilitates performance of arithmetic operations with respect to at least a portion of the information included in the table.

According to yet another exemplary embodiment, a non-transitory computer readable storage medium storing instructions for extracting information from a table in a document is provided. The storage medium includes executable code which, when executed by at least one processor, causes the at least one processor to: receive a document that includes information that is arranged in a table; determine a first set of line coordinates that relates to a plurality of lines of the document; determine a second set of word coordinates that relates to a plurality of words included in the document; determine a third set of character coordinates that relates to a plurality of characters included in the document; extract a list of lines from among the plurality of lines based on the first set of coordinates; reconstruct a plurality of rows of the table based on the extracted list of lines and the determined second set of coordinates; reconstruct a plurality of columns of the table based on the reconstructed plurality of rows and the determined third set of coordinates; and output, via the communication interface, a reconstruction of the table based on the reconstructed plurality of rows and the reconstructed plurality of columns.

Each of the first set of coordinates, the second set of coordinates, and the third set of coordinates may be expressible in an hOCR format that is based on an open standard for representation of scanned information that is obtainable by using an optical character recognition (OCR) technique.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a set of line coordinates, word coordinates, and character coordinates for an example input document as expressed in an hOCR format, according to an exemplary embodiment.

FIG. 7 is a set of column reference coordinates for an example of a table reconstruction, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
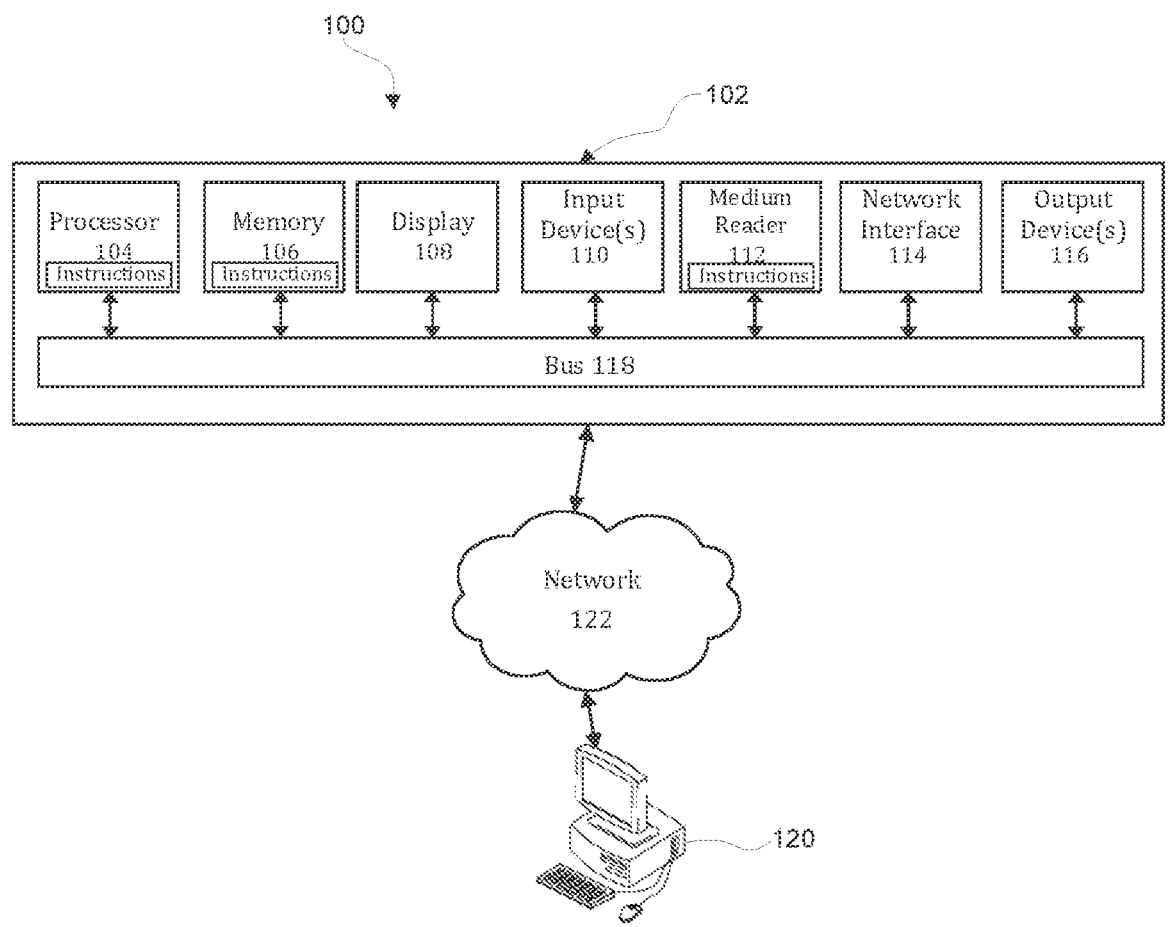
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for extracting and converting tabular information from image and digital formats to editable file formats in order to facilitate subsequent automated processing, data analysis, information extraction, data modeling, building cognitive solutions, building natural language processing solutions, and/or document understanding.

Figure 2:
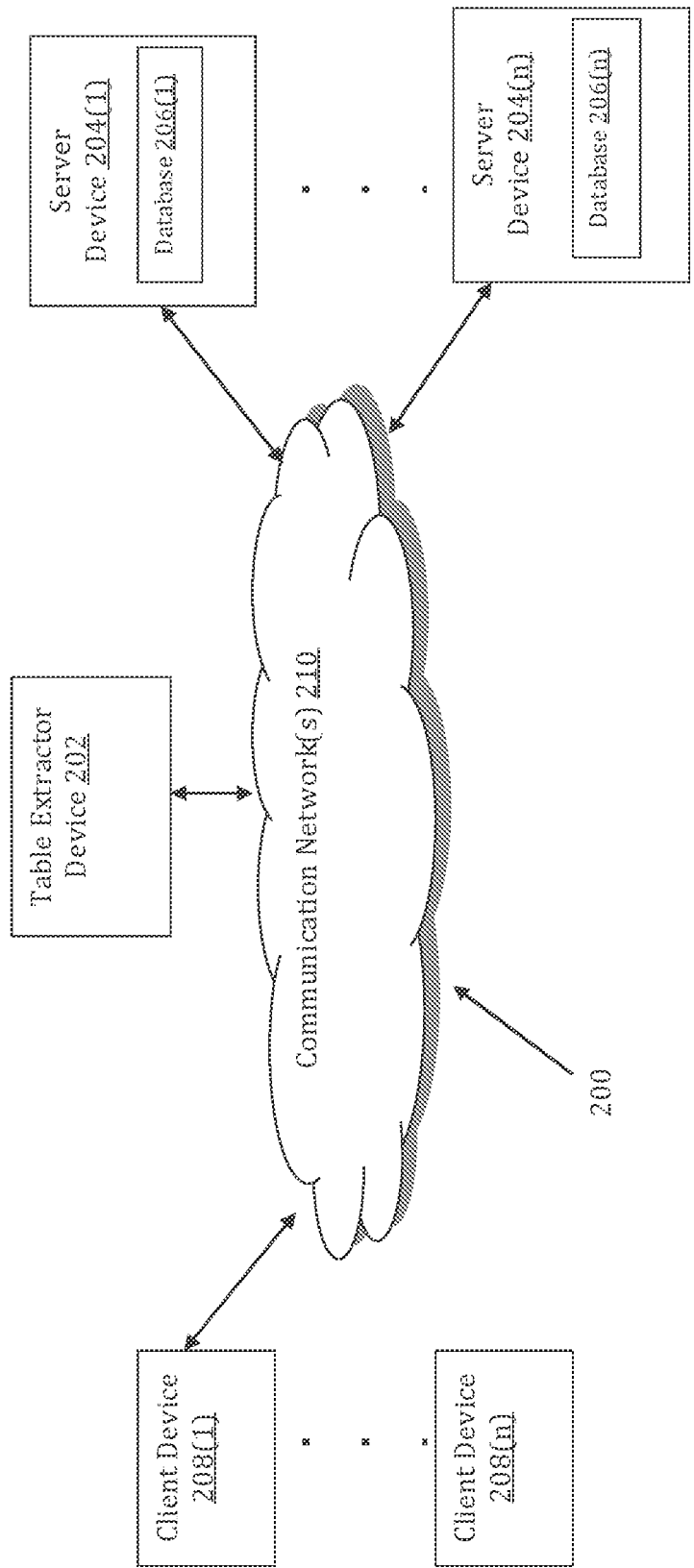
FIG. 2 illustrates an exemplary diagram of a network environment.

Referring to FIG. 2, a schematic of an exemplary network environment 200 for implementing a extracting and converting tabular information from image and digital formats to editable file formats in order to facilitate subsequent automated processing, data analysis, information extraction, data modeling, building cognitive solutions, building natural language processing solutions, and/or document understanding is illustrated. In an exemplary embodiment, the method is executable on any networked computer platform, such as, for example, a personal computer (PC).

The method for extracting and converting tabular information from image and digital formats to editable file formats may be implemented by a Table Extractor (TE) device 202. The TE device 202 may be the same or similar to the computer system 102 as described with respect to FIG. 1. The TE device 202 may store one or more applications that can include executable instructions that, when executed by the TE device 202, cause the TE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TE device 202 itself, may be located in virtual server(s) running in a cloud-based computing environment rather than being tied to one or more specific physical network computing devices. Also, the application(s) may be running in one or more virtual machines (VMs) executing on the TE device 202. Additionally, in one or more embodiments of this technology, virtual machine(s) running on the TE device 202 may be managed or supervised by a hypervisor.

In the network environment 200 of FIG. 2, the TE device 202 is coupled to a plurality of server devices 204(1)-204(n) that hosts a plurality of databases 206(1)-206(n), and also to a plurality of client devices 208(1)-208(n) via communication network(s) 210. A communication interface of the TE device 202, such as the network interface 114 of the computer system 102 of FIG. 1, operatively couples and communicates between the TE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TE devices that efficiently implement a method for extracting and converting tabular information from image and digital formats to editable file formats in order to facilitate subsequent automated processing, data analysis, information extraction, data modeling, building cognitive solutions, building natural language processing solutions, and/or document understanding.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IL device 202 may be a standalone device or integrated with one or more other devices or apparatuses, such as one or more of the server devices 204(1)-204(n), for example. In one particular example, the TE device 202 may include or be hosted by one of the server devices 204(1)-204(n), and other arrangements are also possible. Moreover, one or more of the devices of the TE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store file format data and data pertaining to document types and fillable forms that are widely used by various entities.

Although the server devices 204(1)-204(n) are illustrated as single devices, one or more actions of each of the server devices 204(1)-204(n) may be distributed across one or more distinct network computing devices that together comprise one or more of the server devices 204(1)-204(n).

Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IL device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TE device 202, the server devices 204(1)-204(n), or the client devices 208(1)-208(n), for example, may be configured to operate as virtual instances on the same physical machine. In other words, one or more of the TE device 202, the server devices 204(1)-204(n), or the client devices 208(1)-208(n) may operate on the same physical device rather than as separate devices communicating through communication network(s) 210. Additionally, there may be more or fewer TE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
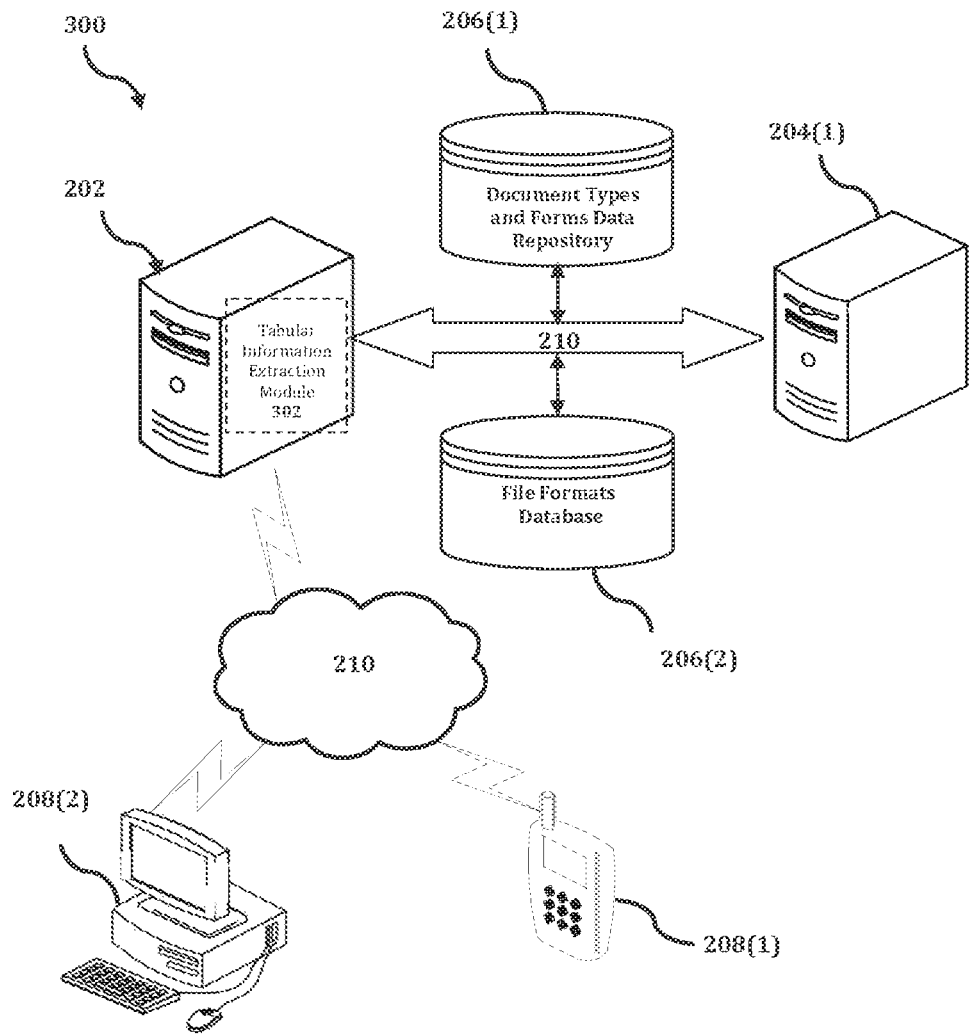
FIG. 3 shows an exemplary system for implementing a method for extracting and converting tabular information from image and digital formats to editable file formats in order to facilitate subsequent automated processing, data analysis, information extraction, data modeling, building cognitive solutions, building natural language processing solutions, and/or document understanding.

The TE device 202 is described and shown in FIG. 3 as including a tabular information extraction module 302, although it may include other rules, policies, modules, databases, or applications, for example. As will be described below, the tabular information extraction module 302 is configured to implement a method for extracting and converting tabular information from image and digital formats to editable file formats in an automated, efficient, scalable, and reliable manner.

An exemplary process 300 for implementing a method for extracting and converting tabular information from image and digital formats to editable file formats by utilizing the network environment of FIG. 2 is shown as being executed in FIG. 3. Specifically, a first client device 208(1) and a second client device 208(2) are illustrated as being in communication with TE device 202. In this regard, the first client device 208(1) and the second client device 208(2) may be "clients" of the TE device 202 and are described herein as such. Nevertheless, it is to be known and understood that the first client device 208(1) and/or the second client device 208(2) need not necessarily be "clients" of the TE device 202, or any entity described in association therewith herein. Any additional or alternative relationship may exist between either or both of the first client device 208(1) and the second client device 208(2) and the TE device 202, or no relationship may exist.

Further, TE device 202 is illustrated as being able to access a document types and forms data repository 206(1) and a file formats database 206(2). The tabular information extraction module 302 may be configured to access these databases for implementing a method for extracting and converting tabular information from image and digital formats to editable file formats in order to facilitate subsequent automated processing, data analysis, information extraction, data modeling, building cognitive solutions, building natural language processing solutions, and/or document understanding.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TE device 202 via broadband or cellular communication. Of course, these embodiments are merely exemplary and are not limiting or exhaustive.

Upon being started, the tabular information extraction module 302 executes a process to extracting and converting tabular information from image and digital formats to editable file formats in order to facilitate subsequent automated processing, data analysis, information extraction, data modeling, building cognitive solutions, building natural language processing solutions, and/or document understanding. An exemplary process for extracting and converting tabular information from image and digital formats to editable file formats is generally indicated at flowchart 400 in FIG. 4.

Figure 4:
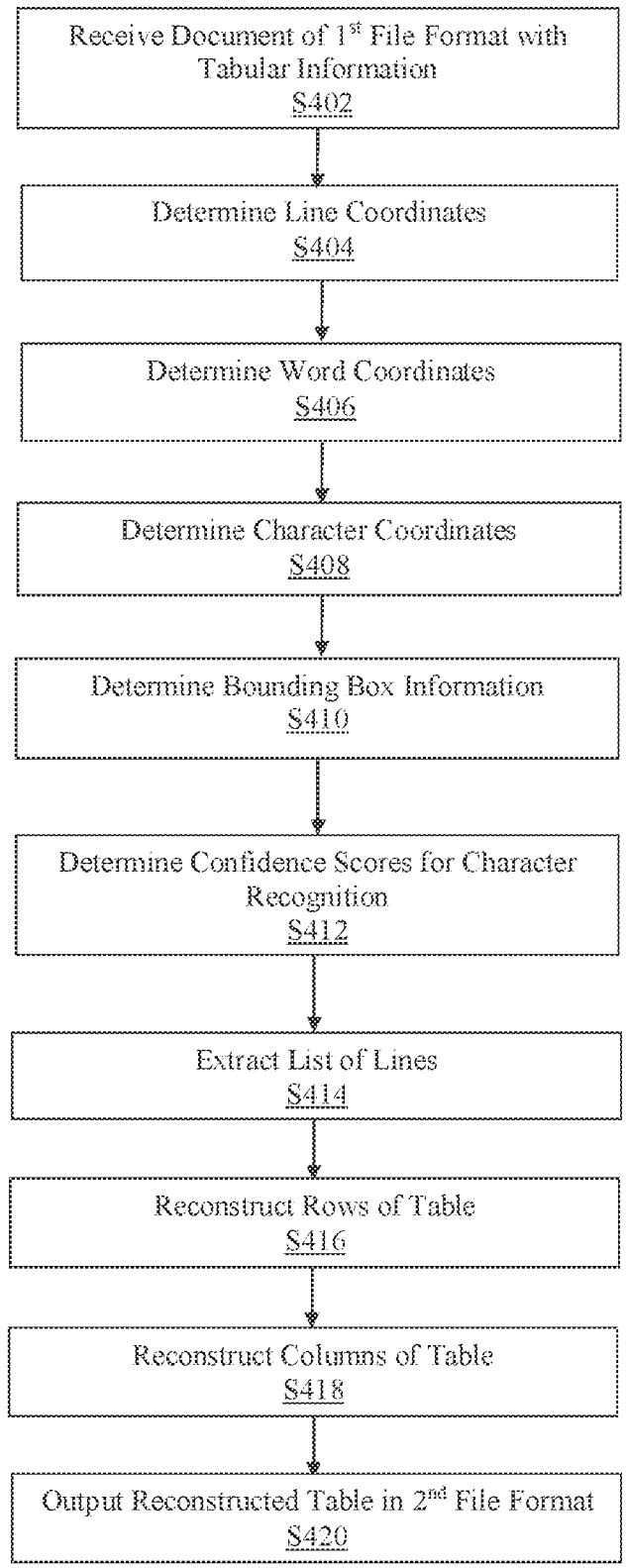
FIG. 4 is a flowchart of an exemplary process for implementing a method for extracting and converting tabular information from image and digital formats to editable file formats in order to facilitate subsequent automated processing, data analysis, information extraction, data modeling, building cognitive solutions, building natural language processing solutions, and/or document understanding.

In the process 400 of FIG. 4, at step S402, the tabular information extraction module 302 receives a document that includes tabular information. The document has a file format, such as, for example, a Portable Digital Format (PDF) format, an image file format, or a word processing software format.

At step S404, the tabular information extraction module 302 determines a first set of line coordinates that corresponds to the lines of the input document. At step S406, the tabular information extraction module 302 determines a second set of word coordinates that corresponds to the words included in the input document. At step S408, the tabular information extraction module 302 determines a third set of coordinates that corresponds to the characters included in the input document. As a result, the tabular information extraction module has determined three sets of coordinates that correspond to the contents of the input document. In an exemplary embodiment, the three sets of coordinates are expressible in an hOCR format that is based on an open standard for representation of scanned information that is obtainable by using an optical character recognition (OCR) technique.

At step S410, the tabular information extraction module 302 uses the three sets of coordinates to determine bounding box information for the content of the input document.

At step S412, the tabular information extraction module 302 determines confidence scores that correspond to the quality of character recognition with respect to the characters included in the content of the input document.

At step S414, the tabular information extraction module 302 extracts a list of lines based on the line coordinates. In an exemplary embodiment, the extraction of the list of lines is performed by extracting metadata that corresponds to the respective position of each line with respect to the bounding box.

At step S416, the tabular information extraction module 302 reconstructs the rows of the table by using the word coordinates and the list of lines. In an exemplary embodiment, the reconstruction of the rows includes a calculation of a minimum space between any two consecutive lines in the document, calculating a respective line coordinate that corresponds to the midpoint of each respective word included in the document, and using the results of these two calculations to reconstruct the rows.

At step S418, the tabular information extraction module 302 reconstructs the columns of the table by using the reconstructed rows and the character coordinates. In an exemplary embodiment, the reconstruction of the columns includes a first phase of separating the characters into columns within an individual row and a second phase of arranging cells in each row in appropriate columns relative to other rows. In particular, the column reconstruction may include determining a maximum width of all of the characters included in the document, determining whether each respective pair of consecutive words belongs in the same column, and using the results of these two determinations to reconstruct the columns.

At step S420, the tabular information extraction module 302 outputs a reconstruction of the table, based on the reconstructions of the rows and columns of the table. In an exemplary embodiment, the reconstruction of the table to be output is in a second file format that is different from the file format of the original input document. For example, the output file format may be any one or more of a Hypertext Markup Language (HTML) format, an Extensible Markup Language (XML) format, an Extensible Hypertext Markup Language (XHTML) format, a JavaScript Object Notation (JSON) format, a Dataframe format, a File Object format, a Byte Stream format, and/or a spreadsheet software format that facilitates performance of arithmetic operations for at least a portion of the reconstructed table.

Portable Digital Format (PDF) has revolutionized the digitization era by enabling commercial businesses to conveniently store multiple data formats in a single file format. However, there is a need to extract and store structured data from a mix of structured and unstructured data, in order to make it available for further processing for automation services and intelligent solutions. In an exemplary embodiment, the method illustrated in FIG. 4 addresses this need.

There are various avenues of application in this regard: First, invoice automation, which may be defined as automatic capture of invoice values and segregation based on categories of expenditure. In an exemplary embodiment, invoice automation can be further developed into a recommender system to recommend the best choice of products and brands. Second, financial spreading, which may be defined as automation of value extraction from financial documents to help gauge risk, evaluate loan health and facilitate loan disbursal. Third, form automation, which is intended to help prevent printing of forms and storing hard copies of documents, only to be destroyed later on. Through the use of form automation, forms can be filled using software once tables are extracted from the document.

There are several challenges that are addressed by the exemplary embodiments disclosed herein. A first challenge is image quality and format consistency. The tables are generally not constant throughout, may have different formatting styles, or may be metalinguistic.

A second challenge relates to a variety of structural layouts. Tables may be simple or complex. One cell may span over several cells, either vertically or horizontally, and combinations of spanning cells can create a number of variations. Further, table lines can affect the way that the structure of the table is understood. Sometimes the table might not have any lines at all to segregate rows and columns. Sometimes, there might be gradients to distinguish between two consecutive rows or two consecutive columns. There might be no bounding box to demarcate the table boundary. Paddings and margins will not always be the same. Some tables have a lot of padding inside cells, and some do not. These visual variations in tables make it difficult to accurately find the related cells and extract information from them. For these reasons, it is important to build an algorithm that is robust in handling different structures of tables.

Figure 5:
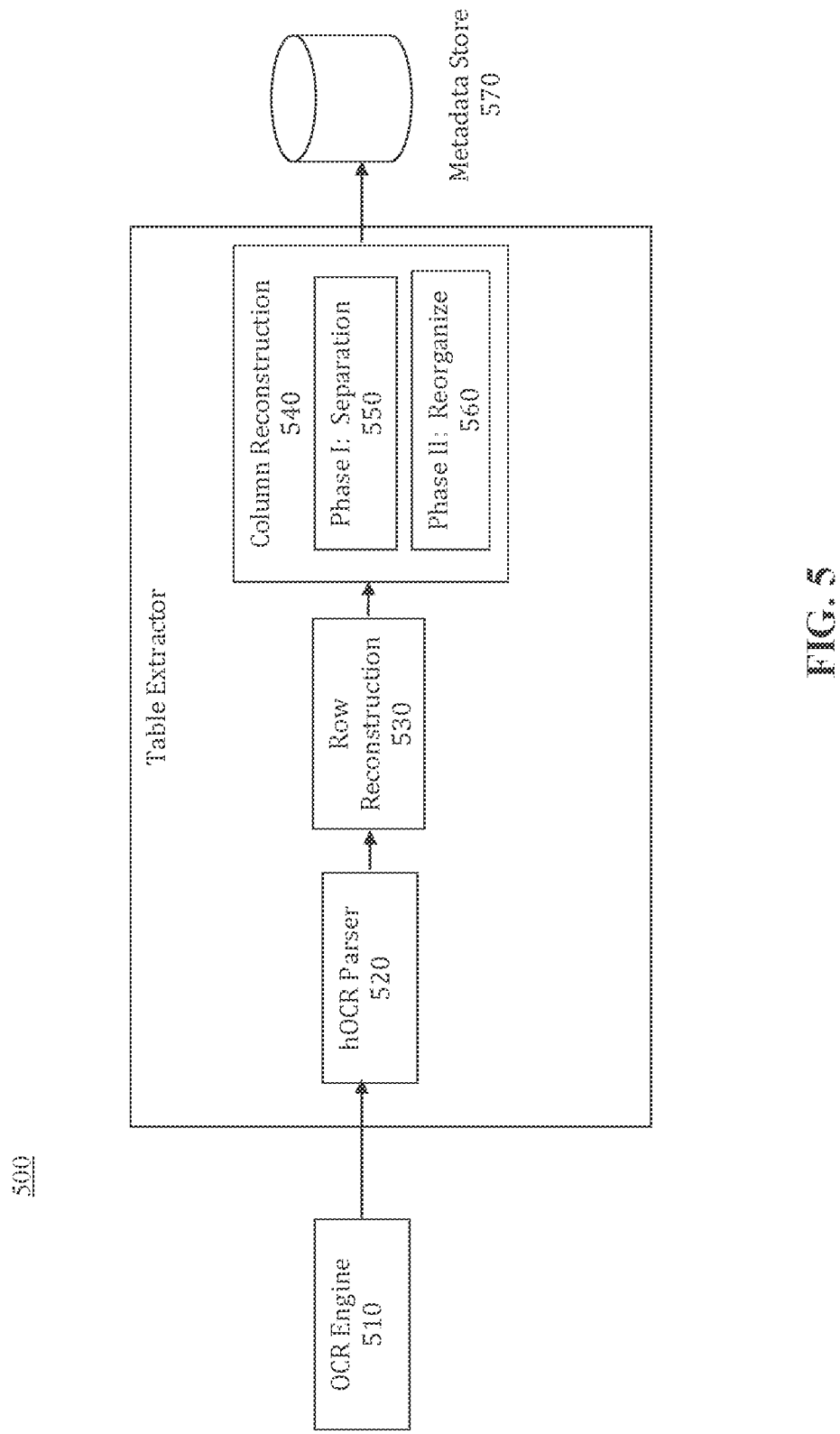
FIG. 5 is an architecture diagram of a system for implementing a method for extracting and converting tabular information from image and digital formats to editable file formats in order to facilitate subsequent automated processing, data analysis, information extraction, data modeling, building cognitive solutions, building natural language processing solutions, and/or document understanding, according to an exemplary embodiment.

FIG. 5 is an architecture diagram 500 of a system for implementing a method for extracting and converting tabular information from image and digital formats to editable file formats in order to facilitate subsequent automated processing, data analysis, information extraction, data modeling, building cognitive solutions, building natural language processing solutions, and/or document understanding, according to an exemplary embodiment.

According to one or more exemplary embodiments, a core idea is to view each phase, row reconstruction and column reconstruction, as clustering steps. The number of clusters are not predefined, but is instead calculated using heuristics and statistical methods, which makes the solution able to handle a wide variety of formats.

Referring to FIG. 5, the Table Extractor device 202 consumes an input 510 of coordinates of data at three levels, in hOCR format, an open standard for metadata representation of the information obtained from OCR engine (Optical Character Recognition engine). The three levels are line, word, and character.

FIG. 6 is a set 600 of line coordinates, word coordinates, and character coordinates for an example input document as expressed in an hOCR format, according to an exemplary embodiment.

Referring also to FIG. 6, the hOCR format includes information about text that is present in the document, bounding box information, and the confidence scores of character recognition by the OCR engine.

The hOCR parser 520 performs a data preparation function. Once the coordinates' information is fed to the Table Extractor device 202, it spans all line tags on the page using the hOCR and prepares a list of lines, with metadata of their bounding box information, in ascending order of their y-start coordinates.

Lines belonging to different blocks of text or to different cells may essentially belong to the same row or to different rows in the actual table. It is essential to eliminate lines that belong to the same row of the table in order to keep the calculations clean. Consecutive lines with difference in y-coordinates below a threshold are eliminated from consideration to do further calculations of table reconstruction.

The extracted information of the lines on the page, i.e., those which remain after removing the unusable lines, is used to calculate the minimum space between any two consecutive lines on that particular page.

The row reconstruction module 530 separates the information on the page into rows. First, the row reconstruction module 530 calculates a minimum space between any two consecutive lines on the page by subtracting the y-coordinate midpoint of the former line from the y-coordinate midpoint of the latter line, in accordance with the following expression:

$$\min_{1 \leq i < no\ Of\ Lines} \left| \frac{(y_{i+1_{top}} + y_{i+1_{bottom}})}{2} - \frac{(y_{i_{top}} + y_{i_{bottom}})}{2} \right|$$

The row reconstruction module 530 then extracts the bounding box data of all words on any given page from the hOCR by spanning all word tags on that page in the hOCR. The $x_{start}$, $y_{start}$, $x_{end}$, and $y_{end}$ information of the bounding boxes is stored in a data structure. The y-coordinate midpoints ($y_{mp}$) of all words on the page is calculated by using the information extracted above, and then the $y_{mp}$ information is sorted in ascending order of values.

The $y_{mp}$ of the first word on the page will be referred to as the y-coordinate of first row of the page.

The row reconstructions module 530 uses minimum space between lines, as calculated above, as a threshold, and then determines the coordinates of rest of the rows on the page. The $y_{mp}$ of the first word that falls out of the threshold distance is evaluated as the y-coordinate of the next row. A similar process is repeated for finding out the y-coordinates of all rows, in accordance with the following logic:

```
threshold = min_space_between_lines
row_coordinate_dict -> dict
counter = 0
prev_row_coordinate = word_y_mp_sorted_list[0]
row_coordinate_dict[counter] = prev_row_coordinate
for word_y_mp in word_y_mp_sorted_list{
    if (word_y_mp - prev_row_coordinate) > threshold{
```

```
        counter += 1
        prev_row_coordinate = word_y_mp
        row_coordinate[counter] = word_y_mp
    }
}
```

The row coordinates calculated above are analogous to centroids of clusters. Each word will be assigned to a cluster based on the distance of the word from the cluster centroid. The row reconstruction module 530 evaluates the vertical distance between midpoint of each word on the page and y-coordinate of each row (cluster centroid, as evaluated above). Each word is then placed in the row that has minimum distance from the $y_{mp}$ of the word.

For any given word, the word belongs to the row for which the following value is minimized:

$$\min_{1 \leq i \leq no\,Of\,Rows} |(y_{mp} - y_i)|$$

The column reconstruction module 540 separates the information on the page into columns in two phases. In the first phase 550, the information within each individual row is separated into columns. Using the hOCR, the column reconstruction module 540 spans all character tags ('C') and deduces the maximum width of a character on the page. This maximum width of a character on the page is used as a threshold, and variations in spaces are also used to identify whether two consecutive words belong to the same column in the table or to different columns in the table. For any page:

$$\max Char\,Width = \max_{1 \leq k < characters} |(x_{end_i} - x_{start_i})|$$

Sometimes, the header of the table may have a larger font as compared to the body of the table, in which case the maximum width of a character on the page may give a wrong indication of the space between words. Hence, the average width of a character on the page may also be calculated, in accordance with the following expression:

$$avgChar\,Width = \frac{\sum_{k=1}^{characters}(x_{end_i} - x_{start_i})}{characters}$$

If the difference between the average width of a character on the page and maximum width of a character on the page lies beyond a defined threshold, average width of a character is used as the threshold to identify the word placement in columns.

Any two consecutive words that have more space than the threshold calculated above are determined as lying in two different columns. Hence, each row is, individually, divided into different number of clusters. All the row and column information is stored in a data structure.

At this stage, each cell contains zero or more words. After this step, cells will move as a whole and words will not be arranged individually.

FIG. 7 is a set of column reference coordinates 700 for an example of a table reconstruction, according to an exemplary embodiment.

In the second phase 560, the cells in each row are arranged in appropriate columns relative to other rows. Since each row has been divided into different number of clusters, the next task is to find the most probable number of clusters (number of columns) in the table, on the whole. For this, the column reconstruction module 540 calculates the number of columns that occur most frequently across all rows of the table using information obtained in the first phase 550. Referring also to FIG. 7, the column reconstruction module 540 calculates a mode number of columns. The value of mode will represent the number of clusters and, hence, the number of columns in the table.

Using all the rows that have mode number of columns, the column reconstruction module 540 defines boundaries of the cluster by calculating the maximum span of each column. For each column, the nearest end is the reference for that particular column to start and the farthest end is the reference for that particular column to end. These cluster reference coordinates will be used to arrange the rest of the words on the page into appropriate columns. These will be cluster centroids for each column of the table.

The column reconstruction module 540 then loops over all cells (in rows containing mode number of columns) in a column and use x-coordinates, $x_{start}$ of the nearest starting term, and $x_{end}$ of the farthest ending term, as reference coordinates of column start and column end. These are analogous to means of clusters. For $i^{th}$ column, the following expressions are valid:

$$x_{ref-start_i} = \min_{1 \leq j \leq rows}(x_{start_{i,j}})$$

$$x_{ref-end_i} = \max_{1 \leq j \leq rows}(x_{end_{i,j}})$$

For each cell and each cluster (reference column), the column reconstruction module 540 calculates the value of belonging. Belonging is defined as the fraction of the cell that belongs to that cluster (reference column). For a particular cell and $i^{th}$ reference column, belonging may be calculated based on the following expression:

$$belonging_i = \frac{\min(x_{end}, x_{ref-end_i}) - \max(x_{start}, x_{ref-start_i})}{x_{end} - x_{start}}$$

The column reconstruction module 540 then places the cell in the cluster (reference column) that has the maximum value of belonging, in accordance with the following expression:

$$column = i : \max_{1 \leq i \leq no\,Of\,Ref\,Cols}(belonging_i)$$

The table has thus been reconstructed, and the row and column indices are stored in the metadata store 570.

Accordingly, with this technology, an optimized process for implementing methods and systems for extracting and converting tabular information from image and digital formats to editable file formats in order to facilitate subsequent automated processing, data analysis, information extraction, data modeling, building cognitive solutions, building natural language processing solutions, and/or document understanding is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for extracting information from a table in a document, the method being implemented by at least one processor, the method comprising:

receiving, by the at least one processor, a document that includes information that is arranged in a table;

determining, by the at least one processor, a first set of line coordinates that relates to a plurality of lines of the document, each line from among the plurality of lines being associated with a plurality of coordinate values within the first set of line coordinates;

determining, by the at least one processor, a second set of word coordinates that relates to a plurality of words included in the document, each word from among the plurality of words being associated with a plurality of coordinate values within the second set of word coordinates;

determining, by the at least one processor, a third set of character coordinates that relates to a plurality of characters included in the document, each character from among the plurality of characters being associated with a plurality of coordinate values within the third set of character coordinates;

extracting, by the at least one processor, a list of lines from among the plurality of lines based on the first set of coordinates;

reconstructing, by the at least one processor, a plurality of rows of the table based on the extracted list of lines and the determined second set of coordinates;

reconstructing, by the at least one processor, a plurality of columns of the table based on the reconstructed plurality of rows and the determined third set of coordinates; and outputting, by the at least one processor, a reconstruction of the table based on the reconstructed plurality of rows and the reconstructed plurality of columns, wherein the reconstructing of the plurality of columns of the table comprises:
- determining a target width of characters included in the plurality of characters;
- determining, for each respective row within the reconstructed plurality of rows and based on the determined target width of characters, whether each respective pair of consecutive words belong in a same cluster or a different cluster; and
- assigning, for each respective row, each word to a cluster, wherein the plurality of rows have different number of clusters,
- determining a number of clusters of a target frequency for the plurality of rows based on a number of clusters present in each row of the plurality of rows, and
- determining a number of columns based on the number of clusters of the target frequency.

2. The method of claim 1, wherein each of the first set of coordinates, the second set of coordinates, and the third set of coordinates is expressible in an hOCR format that is based on an open standard for representation of scanned information that is obtainable by using an optical character recognition (OCR) technique.

3. The method of claim 2, further comprising:
determining, by the at least one processor, information that relates to text that is present in the document;
determining, by the at least one processor, information that relates to a bounding box with respect to each of the first set of coordinates, the second set of coordinates, and the third set of coordinates; and
determining, by the at least one processor, at least one confidence score that relates to a quality of character recognition with respect to the plurality of characters included in the document.

4. The method of claim 3, wherein the extracting of the list of lines includes extracting metadata that relates to a respective position with respect to the bounding box for each line from among the list of lines.

5. The method of claim 1, wherein the reconstructing of the plurality of rows of the table comprises:
calculating a minimum space between any two consecutive lines in the document;
calculating, for each respective word included in the plurality of words, a respective line coordinate that corresponds to a midpoint of the respective word; and
using the calculated minimum space between lines and the calculated respective line coordinate for each respective word to reconstruct the plurality of rows.

6. The method of claim 1, wherein the target frequency is highest frequency.

7. The method of claim 1, wherein the document has a first file format, and the outputted reconstruction of the table has a second file format that is different from the first file format.

8. The method of claim 7, wherein the first file format includes at least one from among a Portable Digital Format (PDF) format, an image file format, and a word processing software format.

9. The method of claim 7, wherein the second file format includes at least one from among a Hypertext Markup Language (HTML) format, an Extensible Markup Language (XML) format, an Extensible Hypertext Markup Language (XHTML) format, a JavaScript Object Notation (JSON) format, a Dataframe format, a File Object format, a Byte Stream format, and a spreadsheet software format that facilitates performance of arithmetic operations with respect to at least a portion of the information included in the table.

10. A computing apparatus for extracting information from a table in a document, the computing apparatus comprising:
a processor;
a memory; and
a communication interface coupled to each of the processor and the memory,
wherein the processor is configured to:
receive, via the communication interface, a document that includes information that is arranged in a table;
determine a first set of line coordinates that relates to a plurality of lines of the document, each line from among the plurality of lines being associated with a plurality of coordinate values within the first set of line coordinates;
determine a second set of word coordinates that relates to a plurality of words included in the document, each word from among the plurality of words being associated with a plurality of coordinate values within the second set of word coordinates;
determine a third set of character coordinates that relates to a plurality of characters included in the document, each character from among the plurality of characters being associated with a plurality of coordinate values within the third set of character coordinates;
extract a list of lines from among the plurality of lines based on the first set of coordinates;
reconstruct a plurality of rows of the table based on the extracted list of lines and the determined second set of coordinates;
reconstruct a plurality of columns of the table based on the reconstructed plurality of rows and the determined third set of coordinates;
output, via the communication interface, a reconstruction of the table based on the reconstructed plurality of rows and the reconstructed plurality of columns;
determine a target width of characters included in the plurality of characters;
determine, for each respective row within the reconstructed plurality of rows and based on the determined target width of characters, whether each respective pair of consecutive words belong in a same cluster or a different cluster; and assign, for each respective row, each word to a cluster, wherein the plurality of rows have different number of clusters, determine a number of clusters of a target frequency for the plurality of rows based on a number of clusters present in each row of the plurality of rows, and determine a number of columns based on the number of clusters of the target frequency.

11. The computing apparatus of claim 10, wherein each of the first set of coordinates, the second set of coordinates, and the third set of coordinates is expressible in an hOCR format that is based on an open standard for representation of scanned information that is obtainable by using an optical character recognition (OCR) technique.

12. The computing apparatus of claim 11, wherein the processor is further configured to:

determine information that relates to text that is present in the document;

determine information that relates to a bounding box with respect to each of the first set of coordinates, the second set of coordinates, and the third set of coordinates; and determine at least one confidence score that relates to a quality of character recognition with respect to the plurality of characters included in the document.

13. The computing apparatus of claim 12, wherein the processor is further configured to extract metadata that relates to a respective position with respect to the bounding box for each line from among the list of lines.

14. The computing apparatus of claim 10, wherein the processor is further configured to:

calculate a minimum space between any two consecutive lines in the document;

calculate, for each respective word included in the plurality of words, a respective line coordinate that corresponds to a midpoint of the respective word; and use the calculated minimum space between lines and the calculated respective line coordinate for each respective word to reconstruct the plurality of rows.

15. The computing apparatus of claim 10, wherein the target frequency is highest frequency.

16. The computing apparatus of claim 10, wherein the document has a first file format, and the outputted reconstruction of the table has a second file format that is different from the first file format.

17. The computing apparatus of claim 16, wherein the first file format includes at least one from among a Portable Digital Format (PDF) format, an image file format, and a word processing software format.

18. The computing apparatus of claim 16, wherein the second file format includes at least one from among a Hypertext Markup Language (HTML) format, an Extensible Markup Language (XML) format, an Extensible Hypertext Markup Language (XHTML) format, a JavaScript Object Notation (JSON) format, a Dataframe format, a File Object format, a Byte Stream format, and a spreadsheet software format that facilitates performance of arithmetic operations with respect to at least a portion of the information included in the table.

19. A non-transitory computer readable storage medium storing instructions for extracting information from a table in a document, the storage medium comprising executable code which, when executed by at least one processor, causes the at least one processor to:

receive a document that includes information that is arranged in a table;

determine a first set of line coordinates that relates to a plurality of lines of the document, each line from among the plurality of lines being associated with a plurality of coordinate values within the first set of line coordinates;

determine a second set of word coordinates that relates to a plurality of words included in the document, each word from among the plurality of words being associated with a plurality of coordinate values within the second set of word coordinates;

determine a third set of character coordinates that relates to a plurality of characters included in the document, each character from among the plurality of characters being associated with a plurality of coordinate values within the third set of character coordinates;

extract a list of lines from among the plurality of lines based on the first set of coordinates;

reconstruct a plurality of rows of the table based on the extracted list of lines and the determined second set of coordinates;

reconstruct a plurality of columns of the table based on the reconstructed plurality of rows and the determined third set of coordinates;

output, via the communication interface, a reconstruction of the table based on the reconstructed plurality of rows and the reconstructed plurality of columns;

determine a target width of characters included in the plurality of characters;

determine, for each respective row within the reconstructed plurality of rows and based on the determined target width of characters, whether each respective pair of consecutive words belong in a same cluster or a different cluster; and assign, for each respective row, each word to a cluster, wherein the plurality of rows have different number of clusters, determine a number of clusters of a target frequency for the plurality of rows based on a number of clusters present in each row of the plurality of rows, and determine a number of columns based on the number of clusters of the target frequency.

20. The storage medium of claim 19, wherein each of the first set of coordinates, the second set of coordinates, and the third set of coordinates is expressible in an hOCR format that is based on an open standard for representation of scanned information that is obtainable by using an optical character recognition (OCR) technique.

* * * * *